United States Patent
Cooler et al.

(10) Patent No.: US 9,344,870 B2
(45) Date of Patent: May 17, 2016

(54) SYSTEMS AND METHODS FOR TIMER CONTINUATION IN A POWER RESET SCENARIO

(71) Applicant: QUALCOMM Incorporated, San Diego, CA (US)

(72) Inventors: Samuel Adam Cooler, San Diego, CA (US); Babla Lamba, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 14/140,141

(22) Filed: Dec. 24, 2013

(65) Prior Publication Data
US 2015/0181402 A1  Jun. 25, 2015

(51) Int. Cl.
| | |
|---|---|
| H04W 4/22 | (2009.01) |
| H04M 1/725 | (2006.01) |
| H04M 1/00 | (2006.01) |
| H04W 76/00 | (2009.01) |
| H04W 4/04 | (2009.01) |
| H04W 8/30 | (2009.01) |

(52) U.S. Cl.
CPC ...... *H04W 4/22* (2013.01); *H04M 1/00* (2013.01); *H04M 1/72538* (2013.01); *H04W 76/007* (2013.01); *H04W 4/046* (2013.01); *H04W 8/30* (2013.01)

(58) Field of Classification Search
CPC ..... H04W 4/22; H04W 76/007; H04W 4/046; H04W 8/30; H04M 1/72538; H04M 1/00
USPC ............................. 455/404.1–404.2, 521
See application file for complete search history.

(56) References Cited

U.S. PATENT DOCUMENTS

| | | | |
|---|---|---|---|
| 2012/0289180 A1 | 11/2012 | Bourdu et al. | |
| 2013/0023228 A1* | 1/2013 | Watson | H04W 4/22 455/404.1 |
| 2013/0078941 A1 | 3/2013 | Moisanen et al. | |
| 2013/0244608 A1 | 9/2013 | Malik et al. | |

OTHER PUBLICATIONS

3GPP TS 24.008 V12.4.0 (Dec. 20, 2013) 3rd Generation Partnership Project; Techinical Specification Group Core Network and Terminals; Mobile radio interface Layer 3 specification; Core network protocols; Stage 3 (Release 12).*
3GPP TS 24.008: "3rd Generation Partnership Project; Technical Specification Group Core Network and Terminals; Mobile radio interface Layer 3 specification; Core network protocols; Stage 3," Version 12.3.0, Release 12, Sep. 2013, 683 pages.

(Continued)

*Primary Examiner* — Michael Mapa
(74) *Attorney, Agent, or Firm* — Austin Rapp & Hardman

(57) ABSTRACT

A method for timer continuation in a power reset scenario by an in-vehicle system is described. The method includes beginning a power reset. The method also includes determining whether a timer associated with an emergency call (e.g., eCall) was running before the power reset. The method further includes continuing timer use if the timer was running before the power reset. The method additionally includes registering the in-vehicle system on a network if the timer was running before the power reset.

20 Claims, 10 Drawing Sheets

(56) References Cited

OTHER PUBLICATIONS

3GPP TS 25.304: "3rd Generation Partnership Project; Technical Specification Group Radio Access Network; User Equipment (UE) procedures in idle mode and procedures for cell reselection in connected mode", Version 11.4.0, Release 11, Sep. 2013, pp. 1-53.

3GPP TS 26.267: "3rd Generation Partnership Project; Technical Specification Group Services and System Aspects; eCall Data Transfer; In-band modem solution; General description", Version 12.0.0, Release 12, Dec. 2012, pp. 1-36.

3GPP TS 26.268: "3rd Generation Partnership Project; Technical Specification Group Services and System Aspects; eCall Data Transfer; In-band modem solution; ANSI-C reference code", Version.11.0.0, Release 11, Sep. 2012, pp. 1-27.

3GPP TS 26.269: "3rd Generation Partnership Project; Technical Specification Group Services and System Aspects; eCall Data Transfer; In-band modem solution; Conformance testing", Version 11.0.0, Release 11, Sep. 2012, pp. 1-17.

3GPP TS 31.102: "3rd Generation Partnership Project; Technical Specification Group Core Network and Terminals; Characteristics of the Universal Subscriber Identity Module (USIM) application", Version 12.2.0, Release 12, Dec. 2013, pp. 1-230.

3GPP: "3GPP TS 24.008 V12.4.0 (Dec. 2013): 3rd Generation Partnership Project; Technical Specification Group Core Network and Terminals; Mobile radio interface Layer 3 specification; Core network protocols; Stage 3 (Release 12)", 3GPP Standard; 3GPP TS 24.008, 3rd Generation Parnership Project (3GPP), Mobile Competence Centre; 650, Route Des Lucioles; F-06921 Sophia-Antipolis Cedex; France, Dec. 19, 2013, pp. 1, 43-243, 282-314, 598-612, Retrieved from the Internet: URL: http://www.3gpp.org/ftp/specs/archive/24_series/24.008/24008-c40.zip.

International Search Report and Written Opinion—PCT/US2014/070682—ISA/EPO—May 20, 2015.

* cited by examiner

SYSTEMS AND METHODS FOR TIMER CONTINUATION IN A POWER RESET SCENARIO

TECHNICAL FIELD

The present disclosure relates generally to electronic devices. More specifically, the present disclosure relates to systems and methods for timer continuation in a power reset scenario.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or more reliably are often sought after.

Some electronic devices communicate with other electronic devices. These electronic devices may transmit electromagnetic signals. For example, a phone (e.g., a cellular phone, a smartphone, a phone integrated into a vehicle, etc.) may obtain, encode and transmit data and/or voice signals. These signals may be received by a network, which may relay the signals to an intended recipient (e.g., a server, a landline phone, a cellular phone, etc.).

However, particular challenges arise in emergency call scenarios. For example, losing connectivity for emergency communications can hamper emergency service efforts. As can be observed from this discussion, systems and methods that improve emergency communications may be beneficial.

SUMMARY

A method for timer continuation in a power reset scenario by an in-vehicle system is described. The method includes beginning a power reset. The method also includes determining whether a timer associated with an emergency call was running before the power reset. The method further includes continuing timer use if the timer was running before the power reset. The method additionally includes registering the in-vehicle system on a network if the timer was running before the power reset.

The method may include initiating a location area update procedure if the timer was running before the power reset. The method may include entering an idle state if the timer was running before the power reset.

The emergency call may be an eCall. The timer may be started for the eCall. The emergency call may be a test or reconfiguration eCall. The timer may be started for the test or reconfiguration eCall.

Continuing timer use may include resuming the timer based on a previously stored timer value. Continuing timer use may include restarting the timer.

An in-vehicle system is also described. The in-vehicle system includes timer control circuitry that determines whether a timer associated with an emergency call was running before a power reset. The timer control circuitry continues timer use if the timer was running before the power reset. The in-vehicle system also includes communication control circuitry coupled to the timer control circuitry. The communication control circuitry registers the in-vehicle system on a network if the timer was running before the power reset.

A computer-program product for timer continuation in a power reset scenario is also described. The computer-program product includes a non-transitory tangible computer-readable medium with instructions. The instructions include code for causing an in-vehicle system to begin a power reset. The instructions also include code for causing the in-vehicle system to determine whether a timer associated with an emergency call was running before the power reset. The instructions further include code for causing the in-vehicle system to continue timer use if the timer was running before the power reset. The instructions additionally include code for causing the in-vehicle system to register the in-vehicle system on a network if the timer was running before the power reset.

An apparatus for timer continuation in a power reset scenario is also described. The apparatus includes means for beginning a power reset. The apparatus also includes means for determining whether a timer associated with an emergency call was running before the power reset. The apparatus further includes means for continuing timer use if the timer was running before the power reset. The apparatus additionally includes means for registering the apparatus on a network if the timer was running before the power reset.

DETAILED DESCRIPTION

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
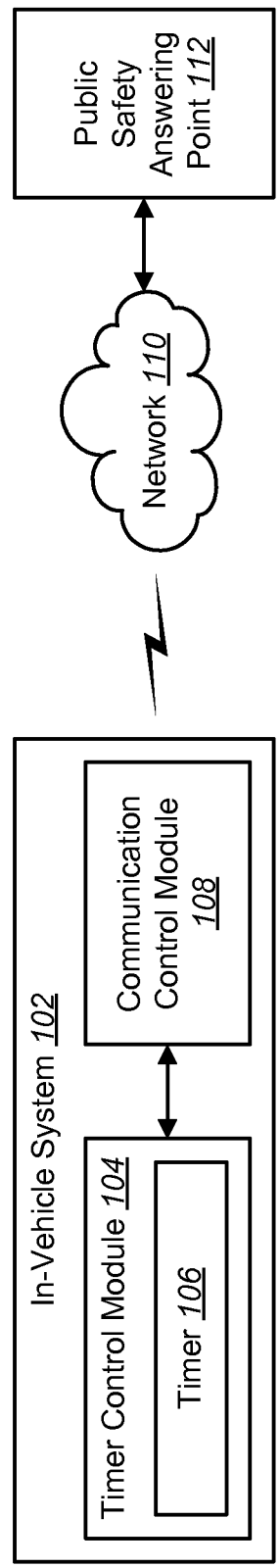
FIG. 1 is a block diagram illustrating one configuration of an in-vehicle system (IVS) in which systems and methods for timer continuation in a power reset scenario may be implemented.

FIG. 1 is a block diagram illustrating one configuration of an in-vehicle system (IVS) 102 in which systems and methods for timer continuation in a power reset scenario may be implemented. The IVS 102 may be an electronic device that is integrated into a vehicle (e.g., automobile, truck, motorcycle, boat, etc.). For example, the IVS 102 may be integrated into a dashboard, console and/or ceiling module. The IVS 102 may wirelessly communicate with a network 110. The IVS 102 may be one example of a user equipment (UE), mobile station (MS) and/or terminal, for example.

The network 110 may include one or more devices that relay communications. Examples of the network 110 include cellular networks, public land mobile networks (PLMNs), local area networks (LANs), wide-area networks (WANs), etc. In some configurations, the network 110 may include one or more base stations, gateways, routers, modems, switches, servers, etc., that relay communications from the IVS 102 to an emergency call answering point (e.g., public safety answering point (PSAP) 112). For example, the network 110 may be a wireless communication network. Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

The network 110 may support communication between the IVS 102 and the PSAP 112. The IVS 102 may place an emergency call in response to an emergency event. An emergency call is a call for emergency services (e.g., police, fire, medical or other emergency services) and may also be referred to as an emergency services call. In some cases, an emergency call may be initiated by a user dialing a well-known emergency number such as "911" in North America or "112" in Europe. It may be desirable to efficiently exchange signaling between the IVS 102 and the network 110 for the emergency call.

An eCall is an emergency call generated at the IVS 102 either automatically via activation of in-vehicle sensors or manually by the vehicle occupant(s). An eCall may include establishing an emergency call (similar to an emergency call initiated by a user dialing "911," for example) and sending additional data. When activated, the eCall provides notification and relevant location information to the most appropriate PSAP 112 by means of the network 110. For example, the IVS 102 may include a voice modem that transmits a standardized 140-byte set of relevant data. The additional data may include vehicle identification, vehicle location, trigger event, etc., and may be sent inband along a voice path and/or out-of-band via separate signaling or data/text transfer.

The IVS 102 then establishes an audio channel between a user (e.g., occupants of the vehicle) and the most appropriate PSAP 112. In some configurations, the IVS 102 may be an "eCall-only" IVS. For example, in order to reduce network 110 congestion, many vehicles may be equipped with an eCall-only IVS, which does not register to the network 110 until initiation of an eCall. In other configurations, the IVS 102 may be a "mixed-mode eCall" IVS. A mixed-mode eCall IVS may be used to perform emergency eCalls as well as non-emergency, subscription-based calls.

More particularly, dedicated eCall devices, such as those associated with a vehicle and designed for the sole purpose to make emergency calls in the event of an accident, are generally referred to as devices that operate in eCall-only mode. That is, eCall-only mode requires at least that the device does not perform mobility management procedures, including registration on a PLMN, except when the device is attempting to initiate and during an emergency call, or when the device is attempting to initiate a test or reconfiguration connection.

An IVS 102 in eCall-only mode (e.g., an "eCall-only IVS") does not register on the network 110 before the eCall is triggered. In case of an eCall emergency trigger, two operations may be performed: the IVS may attempt to register on the mobile network and the IVS may initiate the eCall. Conventionally, registration on the network 110 for an eCall is performed, and then setup information for initiating the emergency call is sent to the network 110 from the IVS 102.

One feature of the eCall system is that an eCall-only device may remain registered on the network 110 for the duration of one or more timers 106 (e.g., T3242 and/or T3243 timers, which expire at 12 hours). Remaining registered may enable emergency responders to call the IVS 102 and communicate with a user (e.g., vehicle occupants) or request a data update.

In an emergency situation (e.g., a vehicle collision), the power supply to the IVS 102 may be disrupted temporarily. For example, the electrical system in a vehicle may be disrupted by a collision and then recover or the vehicle may be turned off and on again. Powering on or activating the IVS 102 (e.g., providing power to the IVS) may be referred to as a "power reset" herein.

Certain problems may occur for an IVS (e.g., an IVS equipped with an eCall-only type subscription) in a power reset scenario. In known approaches, one or more timers are reset (and not running) upon a power reset. For example, 3rd Generation Partnership Project (3GPP) technical specification (TS) 24.008, section 4.2.1.1 addresses the "Selection of the Service State after Power On." In particular, section 4.2.1.1 states that "[f] or an eCall only mobile station (as determined by information configured in the USIM [(Universal Subscriber Identity Module)]), Timers T3242 and T3243 are considered to have expired at power-on." Section 4.4.7 of 3GPP TS 24.008 also describes an "eCall inactivity procedure." In particular, section 4.4.7 states that "[w]hile in eCALL INACTIVE state, the mobile station maintains awareness of a potential serving cell in a potential serving network but initiates no MM [(mobility management) signaling] with the network and ignores any paging requests." "MM signaling" may include signaling for a location area updating procedure and/or signaling for International Mobile Subscriber Identity (IMSI) detach procedures, for example. Accordingly, in the case of a power disruption at the IVS in these known approaches, the T3242/T3243 timers are reset and the IVS boots up to an eCall inactive state. In the inactive state, the IVS is not registered to the network and ignores any paging requests. For example, the IVS may ignore Mobile Terminated (MT) Pages or not monitor the paging channel for an incoming call or text. While in the eCall inactive state, the PSAP would not be able to page the IVS. In order to get the IVS to re-register on a network and allow it to be pageable, another eCall may need to be initiated. This may be undesirable in an emergency situation. For example, the vehicle occupant may be immobilized and unable to initiate another eCall.

The systems and methods disclosed herein may address these problems that occur in a power reset scenario. For example, the systems and methods disclosed herein may allow timer 106 (e.g., eCall timer, test or reconfiguration eCall timer, T3242 timer and/or T3243 timer) continuation in the event of an IVS 102 power reset. For instance, if the IVS 102 was deactivated and power reset while the timer 106 (e.g., T3242 timer and/or T3243 timer) was running, on restoration of power, the IVS 102 may not reset the timer 106 (e.g., T3242 timer and/or T3243 timer), may initiate a location area update procedure, may enter an idle state (e.g., MM IDLE state) and/or may stay registered for the remaining duration of the timer 106 (e.g., T3242 timer and/or T3243 timer). The remaining duration of the timer 106 may be determined by the value of timer 106 before the power reset.

In the configuration illustrated in FIG. 1, the IVS 102 includes a timer control module 104 and a communication control module 108. One or more of the elements of the IVS 102 (e.g., the timer control module 104 and/or the communication control module 108) may be implemented in hardware (e.g., circuitry) or a combination of hardware and software (e.g., a processor with instructions). In the block diagrams provided in the Figures, arrows and/or lines may indicate couplings between components or elements. For example, the timer control module 104 may be coupled to the communication control module 108. As used herein, variations of the term "couple" or "coupling" may denote a direct or indirect connection. For example, the timer control module 104 may be directly connected to the communication control module 108 (without intervening elements, for example) or may be indirectly connected to the communication control module 108 (with one or more intervening elements, for example).

An emergency call may be triggered. For example, an emergency call may be triggered based on vehicle or collision sensors in the vehicle and/or based on a received input (e.g., a button press, a voice command, etc.). In some configurations, the IVS 102 may include collision sensors and/or one or more input devices (e.g., button, touch screen, microphone, camera, etc.), which may trigger an emergency call. Additionally or alternatively, the IVS 102 may be coupled to vehicle or collision sensors and/or one or more input devices. The IVS 102 may trigger an emergency call based on one or more signals from the vehicle or collision sensors and/or one or more input devices. Examples of the emergency call may include a regular emergency call (e.g., eCall) and a test or reconfiguration emergency call (e.g., a test or reconfiguration eCall). The regular emergency call (e.g., eCall) may be an emergency call that is triggered based on an actual emergency event (e.g., vehicle collision, medical emergencies, crime, fire, etc.). The test or reconfiguration emergency call (e.g., test or reconfiguration eCall) is an emergency call that is triggered for testing or reconfiguration purposes.

When an emergency call is triggered, the communication control module 108 may send one or more signals to the network 110 in order to initiate the emergency call. For example, the communication control module 108 may send a registration message and/or other signaling to the network 110 in order to conduct the emergency call.

The timer control module 104 may control one or more timers 106. When the emergency call (e.g., eCall) is triggered, the timer control module 104 may start one or more timers 106. Accordingly, the timer 106 may be associated with the emergency call. For example, the timer control module 104 may include and/or may be coupled to a clock that provides a clock signal. The timer control module 104 may start the timer 106 by causing the timer 106 to begin tracking (e.g., counting) time based on the clock signal. Examples of the timer 106 include a timer for a regular emergency call (e.g., eCall) and a timer for a test or reconfiguration emergency call (e.g., test or reconfiguration eCall). Accordingly, the timer control module 104 may start the timer 106 for a regular emergency call (e.g., eCall) and/or the timer control module 104 may start the same or a different timer 106 for a test or reconfiguration emergency call (e.g., test or reconfiguration eCall). More specific examples of the timer 106 include the T3242 timer and the T3243 timer in accordance with 3GPP specifications.

In some configurations, the timer control module 104 may record a state of the timer 106. For example, the timer control module 104 may set a timer flag (e.g., store a timer flag in memory) indicating that the timer 106 was started and/or running. When the timer 106 is started, for example, the timer flag may be set to indicate that the timer 106 was started and/or running. If the timer expires (e.g., reaches a threshold amount of time), the timer control module 104 may set the timer flag to indicate that the timer 106 is not running. Additionally or alternatively, the timer control module 104 may store a timer value (in memory, for example) that indicates the amount of the timer 106. The timer value may be updated periodically (e.g., at periodic intervals) or may be continuously updated. In some configurations, the timer value may be set to null or to a particular value (e.g., a value that is above the threshold, a negative amount, etc.) to indicate that the timer 106 was not started or running. In some configurations, the timer flag and/or timer value may be stored in non-volatile memory in order to maintain the timer flag and/or timer value in case of power down (e.g., power loss, deactivation, etc.).

In some configurations, the timer control module 104 may additionally store a time stamp value associated with the timer value. For instance, the IVS 102 may include a time-of-day clock that indicates a time-of-day or the IVS 102 may receive a time-of-day from another device. The time stamp may indicate the time-of-day at the point in time when the timer value was stored.

While the timer 106 is running, the communication control module 108 may maintain registration on the network 110. For example, the communication control module 108 may obtain an indicator from the timer control module 104 indicating whether the timer 106 is running or stopped. While the timer 106 is running, the communication control module 108 may send signaling to and/or receive signaling from the network 110 in order to maintain network 110 registration. For example, the communication control module 108 may send mobility management signaling to the network 110 to initiate and/or maintain registration.

As described above, the IVS 102 may experience a power disruption in some cases. For example, the IVS 102 may lose power to continue operating as a result of a collision, powering down (e.g., the user turning off the vehicle) and/or switching to backup or emergency power. In another example, power disruption may be caused due to software and/or firmware crashes on the IVS 102. For instance, a software and/or firmware crash may cause a power reset on the IVS 102.

The IVS 102 may begin a power reset. For example, the IVS 102 may regain power when power is restored (e.g., when power is restored after a collision, when the user turns on the vehicle and/or when backup/emergency power is supplied) and/or when software and/or firmware is restarted. In beginning a power reset, the IVS 102 may provide power to the timer control module 104 and/or to the communication control module 108, for example. The IVS 102 may also run one or more initialization and/or boot procedures in some configurations.

The timer control module 104 may determine whether the timer 106 associated with the emergency call was running before the power reset. In some configurations, the timer control module 104 may obtain (e.g., read from memory) a timer flag that indicates whether the timer 106 was running before the power reset. If the timer flag is set to indicate that the timer 106 was started or running, the timer control module 104 may determine that the timer 106 was running before the power reset. If the timer flag indicates that the timer 106 was not started or running, the timer control module 104 may determine that the timer 106 was not running before the power reset.

In other configurations, the timer control module 104 may obtain a previously stored timer value. For example, the timer control module 104 may obtain a previously stored timer value from memory. If the previously stored timer value indicates a value that is less than a threshold (e.g., an expiration amount), the timer control module 104 may determine that the timer 106 was running before the power reset. If the timer value indicates a null value or some other value that indicates that the timer was not started or running (e.g., a value that is above the threshold, a negative amount, etc.), the timer control module 104 may determine that the timer was not running before the power reset.

If the timer control module 104 determines that the timer 106 was running before the power reset, the timer control module 104 may continue timer use. In some configurations, the timer control module 104 may restart the timer. For example, the timer control module 104 may start the timer 106 afresh from an initial value or 0.

In other configurations, the timer control module 104 may resume the timer 106 based on a previously stored timer value. In one approach, the timer control module 104 may resume the timer from the previously stored timer value. For example, the timer control module 104 may obtain the previously stored timer value from memory and may start the timer 106 from the previously stored timer value. In another approach, the timer control module 104 may resume the timer 106 from the previously stored timer value plus an additional time. For example, the additional time may be a difference in time between the time-of-day when the previously stored timer value was recorded and the current time-of-day. For instance, the IVS 102 may determine this additional time by taking a difference between a time stamp (in memory, for example) associated with the time that the previously stored timer value was recorded and the current time. In this approach, the IVS 102 may include a time-of-day clock that maintains time-of-day through power loss (with a back-up battery, for example) and/or may receive a time-of-day from another device. The additional time may be derived by subtracting the time stamp from the current time-of-day. Accordingly, the timer control module 104 may resume the timer 106 to provide a time value as if the power disruption had not occurred.

The IVS 102 may register the IVS 102 on the network 110 if the timer was running before the power reset. For example, the communication control module 108 may send signaling to the network 110 to register on the network 110. For instance, the communication control module 108 may send mobility management signaling to the network 110 to register on the network 110.

The IVS 102 may optionally initiate a location area update procedure. For example, the timer control module 104 or the communication control module 108 may initiate the location area update procedure if the timer was running before the power reset. For instance, the timer control module 104 may initiate the location area update procedure by sending a signal to the communication control module 108, which may send signaling to the network 110 to initiate a location area update procedure. Alternatively, the communication control module 108 may receive an indicator from the timer control module 104 indicating that the timer 106 was running before the power reset and may send signaling to the network 110 to initiate a location area update procedure. The signaling may indicate the location area of the IVS 102.

The IVS 102 may optionally enter an idle state if the timer 106 was running before the power reset. For example, the IVS 102 may maintain registration (e.g., remain registered) on the network. In some configurations, the timer control module 104 may cause the IVS 102 to enter the idle state by sending an indicator to the communication control module 108 that directs the communication control module 108 to maintain registration on the network. In other configurations, the communication control module 108 may receive an indicator from the timer control module 104 indicating that the timer 106 was running before the power reset. In this case, the communication control module 108 may cause the IVS 102 to enter the idle state by maintaining registration on the network. The idle state may be different from an eCall inactive state, in which the IVS 102 is not registered on the network. Being in the idle state may allow the IVS 102 to receive paging messages, data and/or calls from the network 110. Accordingly, the IVS 102 may be enabled to respond by sending data (e.g., vehicle VIN number, collision data, location data, etc.) and/or by receiving a call.

The timer 106 (e.g., a T3242 timer or a T3243 timer) may continue to run until reaching a threshold time (e.g., an expiration time). One example of a threshold time or expiration time is 12 hours. Other threshold times or expiration times may be utilized. In some configurations, the IVS 102 (e.g., the communication control module 108) may send detach signaling to the network 110 in order to de-register from the network once the timer 106 has expired.

Figure 2:
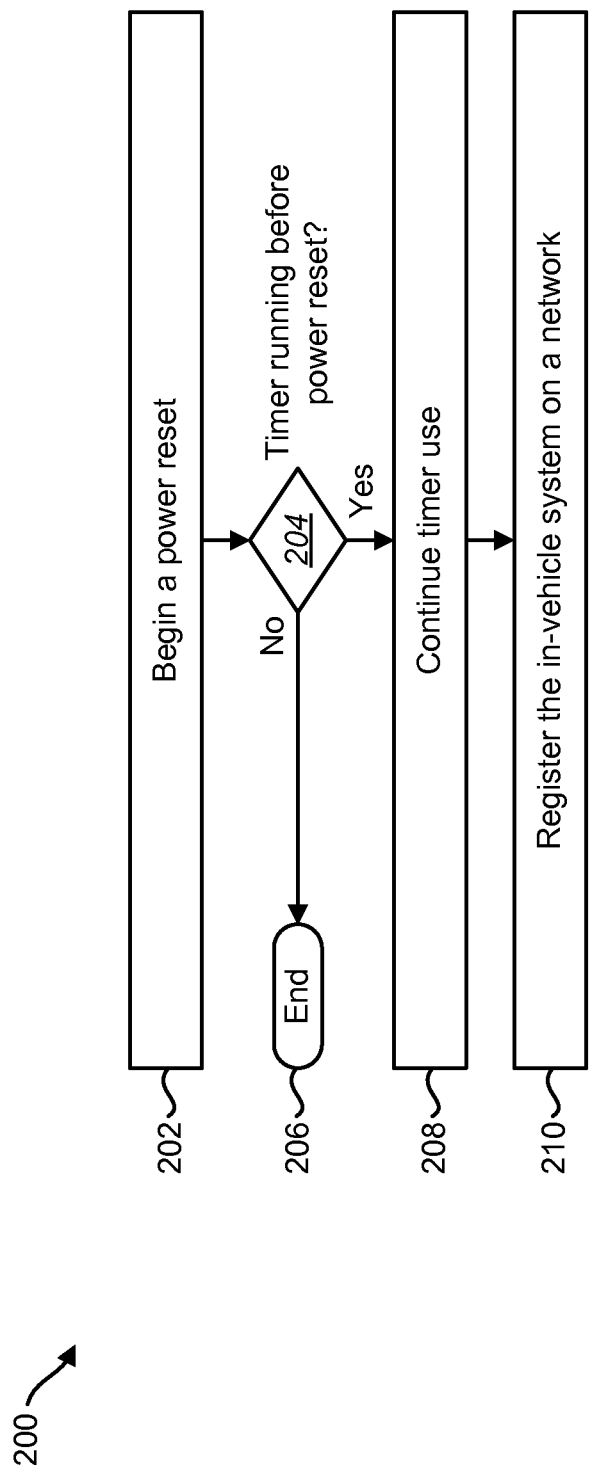
FIG. 2 is a flow diagram illustrating one configuration of a method for timer continuation in a power reset scenario by an IVS.

FIG. 2 is a flow diagram illustrating one configuration of a method 200 for timer continuation in a power reset scenario by an IVS 102. The IVS 102 may begin 202 a power reset. For example, the IVS 102 may begin 202 a power reset after a power disruption and/or after a software and/or firmware crash. This may be accomplished as described above in connection with FIG. 1.

The IVS 102 may determine 204 whether the timer 106 associated with the emergency call was running before the power reset. For example, the IVS 102 may make this determination 204 based on a timer flag and/or a previously stored timer value as described above in connection with FIG. 1.

If the IVS 102 determines 204 that the timer was not running before the power reset, operation may end 206. For example, the IVS 102 may be placed in an eCall inactive state.

However, if the IVS 102 determines 204 that the timer was running before the power reset, the IVS 102 may continue 208 timer use. For example, the IVS 102 may restart or resume the timer 106 as described above in connection with FIG. 1. In this case, the IVS 102 may not be placed in an eCall inactive state and/or may not set the timer(s) 106 as expired.

The IVS 102 may register 210 the IVS 102 on the network 110 if the timer 106 was running before the power reset. For example, the IVS 102 may send signaling to the network 110 to register on the network 110 as described above in connection with FIG. 1.

Figure 3:
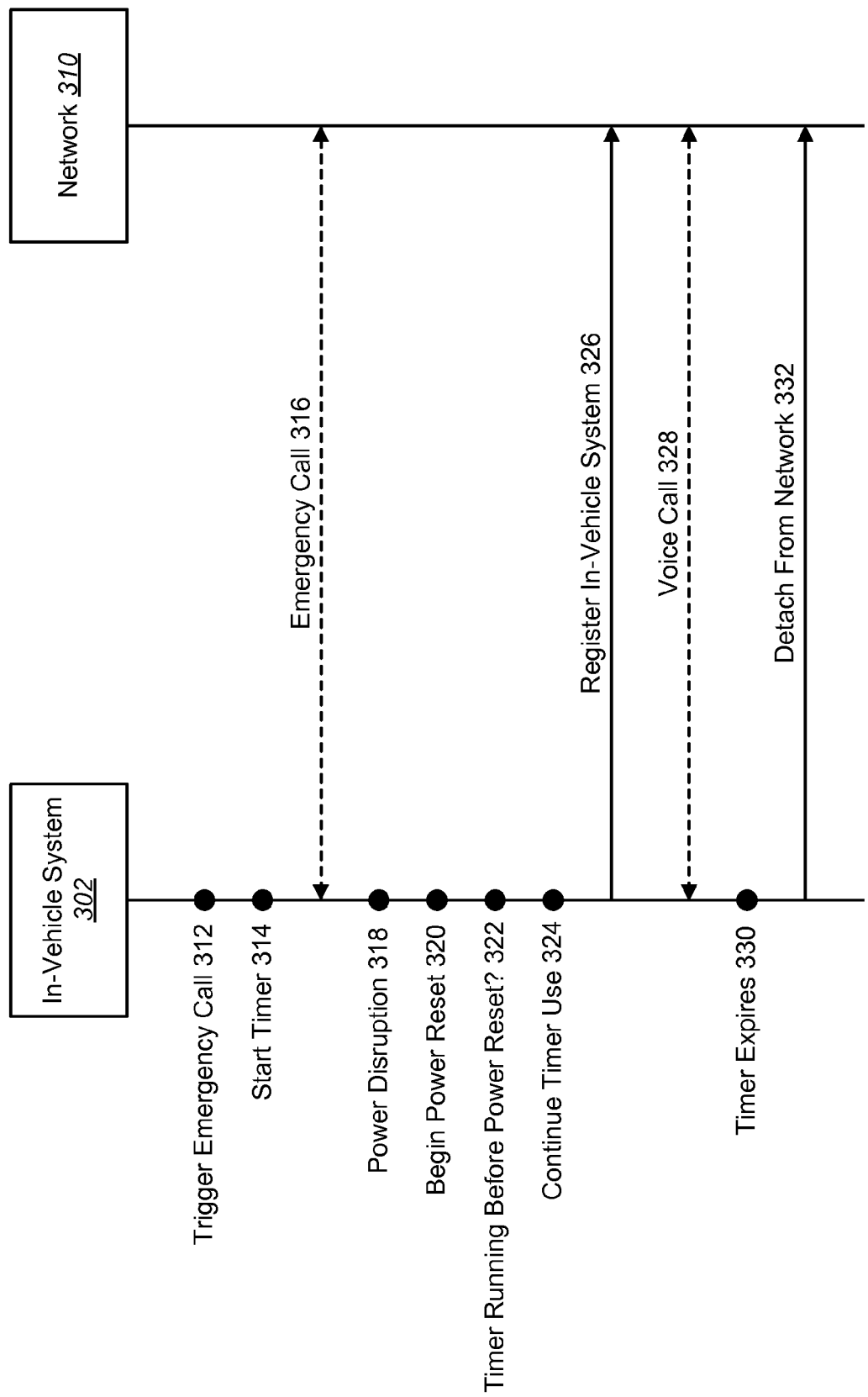
FIG. 3 is a thread diagram that illustrates a power reset scenario in accordance with the systems and methods disclosed herein.

FIG. 3 is a thread diagram that illustrates a power reset scenario in accordance with the systems and methods disclosed herein. In particular, FIG. 3 illustrates an IVS 302, which may be one example of the IVS 102 described in connection with FIG. 1. FIG. 3 also illustrates a network 310, which may be one example of the network 110 described above in connection with FIG. 1.

The IVS 302 may trigger 312 an emergency call (e.g., eCall). For example, the IVS 302 may include vehicle or collision sensors that indicate whether an emergency situation or collision occurs. For example, the collision sensors may include accelerometers that detect when abnormal deceleration has occurred. Additionally or alternatively, the collision sensors may include electromechanical devices that detect impact and/or deformation of a vehicle (e.g., compromised vehicle body integrity) as a result of a collision. Additionally or alternatively, the vehicle or collision sensors may include airbag sensors or an airbag deployment mechanism. The collision sensors may trigger 312 the emergency call. Additionally or alternatively, the IVS 302 may receive an input (e.g., a button press, a contact on a touch screen, a voice command, etc.). The IVS 302 may trigger 312 the emergency call based on the received input.

The IVS 302 may start 314 one or more timers. For example, the IVS 302 may start 314 a T3242 timer for an eCall (for an eCall-only device, for example) or may start 314 a T3243 timer for a test or reconfiguration eCall (for an eCall-only device, for example). As described above in connection with FIG. 1, the IVS 302 may store a timer flag and/or a timer value.

The IVS 302 may conduct an emergency call 316. For example, the IVS 302 may send one or more signals to the network 310 in order to initiate and conduct the emergency call. It should be noted that the IVS 302 may initiate the emergency call 316 before starting 314 the timer, after starting 314 the timer or concurrently with starting 314 the timer.

The IVS 302 may experience a power disruption 318. When the power disruption 318 occurs, the IVS 302 may partially or fully discontinue functioning. As described above, for example, the IVS 302 may lose power as a result of a collision, powering down (e.g., the user turning off the vehicle) and/or switching to backup or emergency power. It should be noted that the power disruption may occur during or after the emergency call 316. For example, the IVS 302 may be in the midst of the emergency call 316 when the power disruption 318 occurs. In another example, the power disruption 318 may occur after the emergency call 316 (e.g., after the IVS 302 has sent data and/or after a voice channel has been opened to the IVS 302). For instance, a user may have spoken with an emergency service operator at a PSAP and may have terminated the call when the power disruption 318 occurs.

The IVS 302 may begin 320 a power reset. As described above, for example, the IVS 302 may regain power when power is restored (e.g., when power is restored after a collision, when the user turns on the vehicle and/or when backup/emergency power is supplied) and/or when software and/or firmware is restarted.

The IVS 302 may determine 322 whether the timer associated with the emergency call was running before the power reset. As described above in connection with FIG. 1, the IVS 302 may determine 322 whether the timer was running based on a timer flag and/or based on a previously stored timer value.

If the timer was running before the power reset, the IVS 302 may continue 324 timer use. For example, the IVS 302 may restart the timer (from 0, for example) or may resume the timer based on a previously stored timer value. In some configurations, the IVS 302 may utilize only the timer flag to determine 322 whether the timer was running before the power reset. In these configurations, the IVS 302 may restart the timer. In other configurations, the IVS 302 may utilize the previously stored timer value to determine 322 whether the timer was running before the power reset. In these configurations, the IVS 302 may restart the timer (from 0, for example) or may resume the timer based on the previously stored timer value. In yet other configurations, the IVS 302 may utilize the timer flag to determine 322 whether the timer was running before the power reset. In these configurations, the IVS 302 may then utilize the previously stored timer value to resume the timer based on the previously stored timer value.

In order to determine 322 whether the timer was running before the power reset and/or to continue 324 timer use (if the timer was running), the IVS 302 may access memory to obtain the timer flag and/or the previously stored timer value. In configurations where the timer flag is stored in memory but a timer value is not, the IVS 302 may access the memory before determining 322 whether the timer was running before the power reset (and before continuing 324 timer use). In configurations where the previously stored timer value is stored in memory but a timer flag is not, the IVS 302 may access the memory before determining 322 whether the timer was running before the power reset (and before continuing 324 timer use). In configurations where both the timer flag and the previously stored timer value are stored in memory, different approaches may be implemented. In one approach, the IVS 302 may obtain both the timer flag and the previously stored timer value before determining 322 whether the timer was running. In another approach, the IVS 302 may obtain just the timer flag before determining 322 whether the timer was running and may obtain the previously stored timer value only after determining 322 that the timer was running (but before continuing 324 timer use in configurations where the timer is resumed based on the previously stored timer value, for example).

The IVS 302 may register 326 the IVS 302 on the network 310 if the timer was running before the power reset. For example, the IVS 302 may send signaling to the network 310 to register on the network 310 as described above in connection with FIG. 1.

In some instances, the IVS 302 may participate in one or more voice calls 328 (e.g., eCalls) after power reset. For example, the IVS 302 may initiate another eCall based on an input (e.g., button press, voice command, etc.). This may be an outgoing emergency call. In another example, the IVS 302 conducts another voice call 328 by receiving an incoming call (from emergency services, for example). In some configurations, there may be no indicator that an incoming call is an emergency call. In addition to or alternatively from the voice call 328, the IVS 302 may send and/or receive text and/or data.

In yet another example, the IVS 302 may initiate another emergency call based on a call-in-progress flag. For instance, in some configurations, the IVS 302 may store a call-in-progress flag when an emergency call 316 is initiated (before the power disruption 318). The call-in-progress flag may be set to indicate that an emergency call is in progress at the initiation of an emergency call 316. The call-in-progress flag may be set to indicate that an emergency call is not in progress at the termination of the emergency call 316. In the case that the emergency call 316 was in progress or ongoing when the power disruption 318 occurs, the IVS 302 may then automatically initiate another emergency call 328 after the power reset 320. For instance, the IVS 302 may obtain the call-in-progress flag from memory. If the call-in-progress flag indicates that an emergency call 316 was in progress (when the power disruption 318 occurred), then the IVS 302 may automatically initiate another emergency call 328 (and may not otherwise).

In other instances, the IVS 302 may not conduct another emergency call 328 after the power reset 320. For example, if another emergency call is not initiated as described in any of the foregoing examples, another emergency call 328 may not be initiated. When the IVS 302 is not conducting another emergency call 328, the IVS 302 may be in an idle state.

The timer may expire 330. For example, the timer (e.g., a T3242 timer or a T3243 timer) may continue to run until reaching a threshold time (e.g., an expiration time). In some configurations, the IVS 302 may detach 332 from the network 310 by sending detach signaling to the network 310 in order to de-register from the network once the timer has expired 330.

Figure 4:
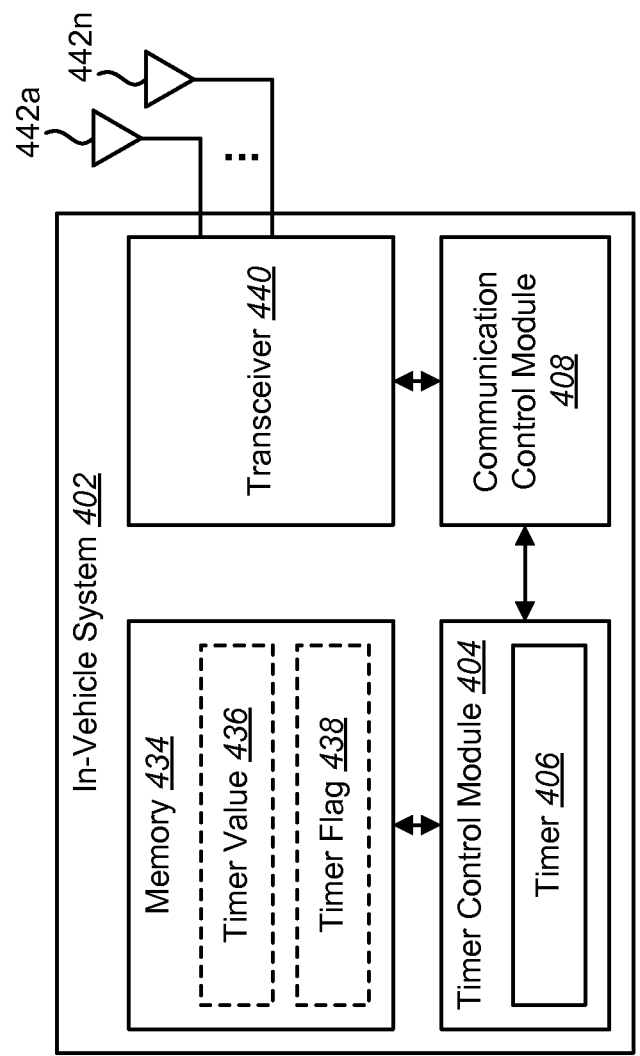
FIG. 4 is a block diagram illustrating a more specific configuration of an IVS in which systems and methods for timer continuation in a power reset scenario may be implemented.

FIG. 4 is a block diagram illustrating a more specific configuration of an IVS 402 in which systems and methods for timer continuation in a power reset scenario may be implemented. The IVS 402 may be one example of the IVS 102 described in connection with FIG. 1. The IVS 402 may include a communication control module 408 and a timer control module 404 that controls one or more timers 406. The timer control module 404 may be one example of the timer control module 104 described in connection with FIG. 1. Additionally, the communication control module 408 may be one example of the communication control module 108 described in connection with FIG. 1. Accordingly, the timer control module 404 and the communication control module 408 may perform corresponding functions as described above. The IVS 402 may also include memory 434, one or more transceivers 440 and/or one or more antennas 442a-n. In some configurations, however, it should be noted that one or more of the memory 434 and the transceiver 440 may be separate from and coupled to the IVS 402.

The memory 434 may be coupled to the timer control module 404. The timer control module 404 may write information to and/or read information from the memory 434. The memory 434 may be any electronic device that stores electronic information. For example, the memory 434 may be random access memory (RAM), read-only memory (ROM), magnetic disk storage media, optical storage media, non-volatile RAM (NVRAM), flash memory, flash memory devices in RAM, on-board memory included with a processor, programmable read-only memory (PROM), erasable programmable read-only memory (EPROM), electrically erasable PROM (EEPROM), registers, and so forth, including combinations thereof. In configurations where the memory 434 is non-volatile, power may not be supplied to the memory 434 during a power disruption. In configurations where the memory 434 is volatile, power may be supplied to the memory 434 in order to maintain stored information. For instance, the memory 434 may be coupled to a back-up power supply (e.g., a back-up battery) in case of a power disruption.

As described above, the timer control module 404 may store a timer flag 438 and/or a timer value 436 in the memory 434. In some configurations, the timer control module 404 may store a timer flag 438 in the memory 434. For example, the timer flag 438 may be represented by a single bit, where one state of the bit (e.g. '1') indicates that the timer 406 was started and/or running and another state of the bit (e.g., '0') indicates that the timer 406 was not running. When the timer 406 is started, for example, the timer flag 438 may be set to '1' to indicate that the timer 406 was started and/or running. If the timer expires (e.g., reaches a threshold amount of time), the timer control module 404 may set the timer flag 438 to '0' to indicate that the timer 406 is not running.

Additionally or alternatively, the timer control module 404 may store the timer value 436 in the memory 434 that indicates the amount of the timer 406. The timer value 436 may be represented as one or more integers and/or as one or more floating point numbers. The integer(s) and/or floating point number(s) may be stored as one or more sets of bits. For example, the timer value 436 may be represented as three sets of bits, where a first set represents an integer number of hours, a second set represents an integer number of minutes and a third set represents an integer number of seconds. In another example, the timer value 436 may be stored as one set of bits that represents a floating point number of seconds. The timer control module 404 may update the timer value 436 periodically (e.g., at periodic intervals) or may be continuously updated. In some configurations, the timer value 436 may be set to null or to a particular value (e.g., a value that is above a threshold, a negative amount, etc.) to indicate that the timer 406 was not started or running.

It should be noted that in some configurations, one or more timer values 436 may be stored, but a timer flag 438 may not be stored. In other configurations, one or more timer flags 438 may be stored, but a timer value 436 may not be stored. In yet other configurations, both one or more timer values 436 and one or more timer flags 438 may be stored.

As described above, in some configurations, the timer control module 404 may additionally store a time stamp value in the memory 434 in some configurations. The time stamp value may be associated with the timer value 436 that indicates a time-of-day when the timer value 436 was stored.

The transceiver 440 may be coupled to the communication control module 408. The transceiver 440 may format, de-format, transmit and/or receive signals. For example, the communication control module 408 may provide a signal (e.g., control signaling, mobility management signaling, a registration signal, location area update signaling, data, a voice signal, a detach signal, etc.) to the transceiver 440. The transceiver 440 may scramble, encode, modulate, precode, upconvert and/or amplify the signal for transmission. The transceiver 440 may then provide the formatted signal to the one or more antennas 442a-n, which may radiate the formatted signal as a wireless electromagnetic signal. The transceiver 440 may also receive a signal from the one or more antennas 442a-n (e.g., paging signaling, data, a voice signal, control signaling, etc.) from another device (e.g., a network). The transceiver 440 may amplify, downconvert, demodulate, decode and/or descramble the received signal. The transceiver 440 may provide the de-formatted signal to the communication control module 408.

Figure 5:
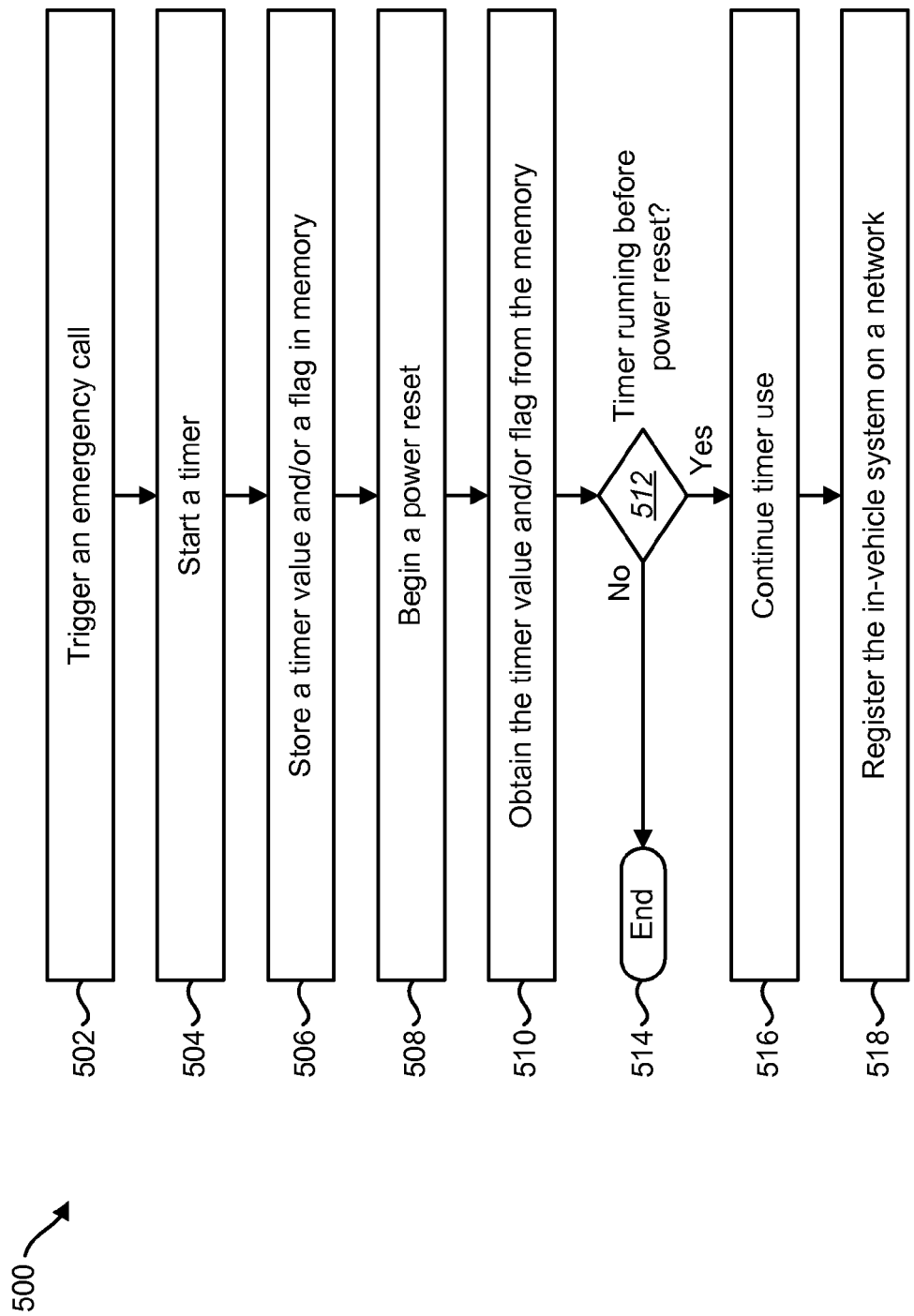
FIG. 5 is a flow diagram illustrating a more specific configuration of a method for timer continuation in a power reset scenario by an IVS.

FIG. 5 is a flow diagram illustrating a more specific configuration of a method 500 for timer continuation in a power reset scenario by an IVS 402. The IVS 402 may trigger 502 an emergency call. For example, the IVS 402 may trigger an emergency call as described above in connection with one or more of FIGS. 1-4.

The IVS 402 may start 504 a timer 406 when the emergency call is triggered. For example, the IVS 402 start 504 a timer 406 as described above in connection with one or more of FIGS. 1-4.

The IVS 402 may store 506 a timer value 436 and/or a timer flag 438 in memory 434. For example, the IVS 402 may store 506 a timer value 436 and/or a timer flag 438 in memory 434 as described above in connection with one or more of FIGS. 1-4.

As described above, a power disruption may occur. The power disruption may occur while the emergency call is ongoing or after an emergency call, but before the timer 406 has expired, for example.

The IVS 402 may begin 508 a power reset. For example, the IVS 402 may begin 508 a power reset as described above in connection with one or more of FIGS. 1-4.

The IVS 402 may obtain 510 the previously stored timer value 436 and/or the timer flag 438 from the memory 434. For example, the IVS 402 may obtain 510 the (previously stored) timer value 436 and/or the timer flag 438 from memory 434 as described above in connection with one or more of FIGS. 1-4. It should be noted that obtaining 510 the previously stored timer value 436 and/or the timer flag 438 from memory 434 may be performed in any of the orders described above in connection with FIG. 3. In some configurations, the IVS 402 may additionally obtain a time stamp from memory 434.

The IVS 402 may determine 512 whether the timer 406 associated with the emergency call was running before the power reset. For example, the IVS 402 may make this determination 512 based on a timer flag 438 and/or a previously stored timer value 436 as described above in connection with one or more of FIGS. 1-4. If the IVS 402 determines 512 that the timer was not running before the power reset, operation may end 514. For example, the IVS 402 may be placed in an eCall inactive state.

If the IVS 402 determines 512 that the timer was running before the power reset, the IVS 402 may continue 516 timer use. For example, the IVS 402 may restart or resume the timer 406 as described above in connection with one or more of FIGS. 1-4.

The IVS 402 may register 518 the IVS 402 on the network if the timer 406 was running before the power reset. For example, the IVS 402 may send signaling to the network to register on the network as described above in connection with one or more of FIGS. 1-4.

Figure 6:
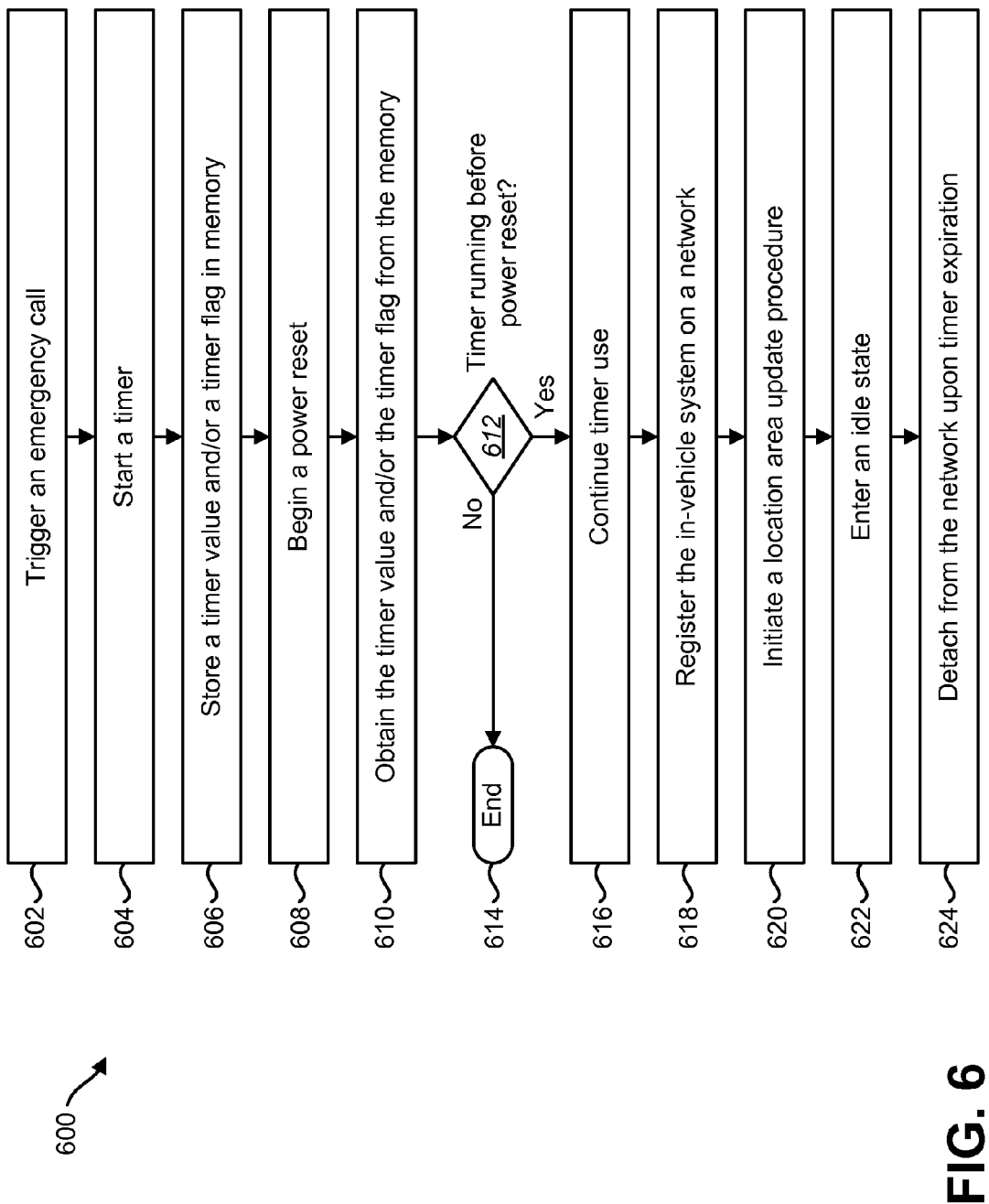
FIG. 6 is a flow diagram illustrating another more specific configuration of a method for timer continuation in a power reset scenario by an IVS.

FIG. 6 is a flow diagram illustrating another more specific configuration of a method 600 for timer continuation in a power reset scenario by an IVS 402. The IVS 402 may trigger 602 an emergency call, start 604 a timer 406 and store 606 a timer value 436 and/or a timer flag 438 in memory 434. These operations may be performed as described above in connection with FIG. 5.

As described above, a power disruption may occur. The power disruption may occur while the emergency call is ongoing or after an emergency call, but before the timer 406 has expired, for example.

The IVS 402 may begin 608 a power reset. For example, the IVS 402 may begin 608 a power reset as described above in connection with one or more of FIGS. 1-5.

The IVS 402 may obtain 610 the (previously stored) timer value 436 and/or the timer flag 438 from the memory 434 and may determine 612 whether the timer 406 associated with the emergency call was running before the power reset. These operations may be performed as described above in connection with FIG. 5.

If the IVS 402 determines 612 that the timer was not running before the power reset, operation may end 614 as described above. If the IVS 402 determines 612 that the timer was running before the power reset, the IVS 402 may continue 616 timer use and register 618 the IVS 402 on the network. These operations may be performed as described above in connection with FIG. 5.

If the timer 406 was running before the power reset, the IVS 402 may initiate 620 a location area update procedure. For example, the IVS 402 may send signaling to the network to initiate a location area update procedure. For example, the IVS 402 may send a location update request (e.g., a "LOCATION UPDATING REQUEST") message to the network. The IVS 402 may receive location area identification information (e.g., "Location Area Identification" in a "LOCATION UPDATING ACCEPT" message) from the network. The IVS 402 may additionally store the location area identification information. The IVS 402 may set an update status (to "UPDATED" in a Subscriber Identity Module (SIM)/USIM, for example) upon successful location updating. In some configurations, the location area update procedure may be in accordance with 3GPP TS 24.008, sections 4.4.1 and 4.4.2, for example.

If the timer 406 was running before the power reset, the IVS 402 may enter 622 an idle state (e.g., MM IDLE). The IVS 402 may remain in the idle state for the duration of the timer 406, except that the IVS 402 may enter an active state during any additional calls (e.g., eCalls, outgoing calls and/or incoming calls). In some configurations, the idle state (e.g., MM IDLE) may include one or more substates. For example, while in the idle state, the IVS 402 may be in a normal service substate (e.g., a "NORMAL SERVICE" state), where the IVS 402 is registered, is monitoring a paging channel and/or is keeping track of available PLMNs/cells. In some configurations, the idle state may be in accordance with 3GPP TS 24.008, section 4.1.2.1.2, for example.

The IVS 402 may detach 624 from the network upon timer 406 expiration (e.g., when the timer 406 reaches a threshold amount). For example, the IVS 402 may send signaling to the network that indicates network detachment. For instance, the IVS 402 may send a detach message (e.g., an "IMSI DETACH INDICATION" message) to the network. In some configurations, detaching from the network may be in accordance with 3GPP TS 24.008, section 4.3.4, for example. The IVS 402 may optionally enter an inactive state (e.g., eCALL INACTIVE) upon timer 406 expiration.

Figure 7:
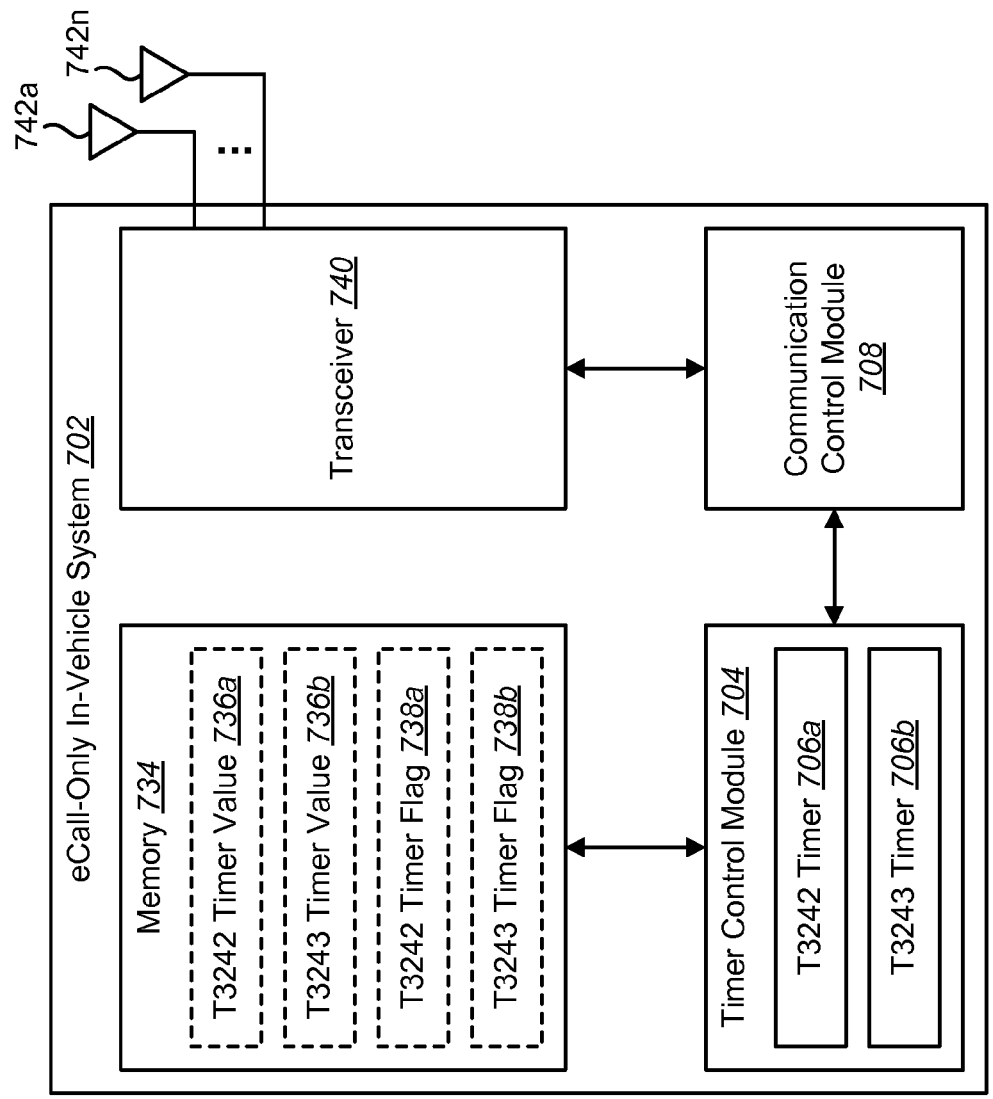
FIG. 7 is a block diagram illustrating one configuration of an eCall-only IVS in which systems and methods for timer continuation in a power reset scenario may be implemented.

FIG. 7 is a block diagram illustrating one configuration of an eCall-only IVS 702 in which systems and methods for timer continuation in a power reset scenario may be implemented. The eCall-only IVS 702 may be one example of one or more of the in-vehicle systems described in connection with one or more of FIGS. 1-6. The eCall-only IVS 702 may include a communication control module 708 and a timer control module 704 that controls a T3242 timer 706a and a T3243 timer 706b. The timer control module 704 may be one example of one or more of the timer control modules 104, 404 described in connection with FIGS. 1 and 4. Additionally, the communication control module 708 may be one example of one or more of the communication control modules 108, 408 described in connection with FIGS. 1 and 4. The eCall-only IVS 702 may also include memory 734, one or more transceivers 740 and/or one or more antennas 742a-n. The memory 734, transceiver 740 and antennas 742a-n may be examples of the memory 434, transceiver 440 and antennas 442a-n described above in connection with FIG. 4. Accordingly, the timer control module 704, the communication control module 708, the memory 734 and the transceiver 740 may perform corresponding functions as described above.

In the configuration illustrated in FIG. 7, the timer control module 704 may store one or more of a T3242 timer flag 738a, a T3243 timer flag 738b, a T3242 timer value 736a and a T3243 timer value 736b in the memory 734. For example, the T3242 timer flag 738a corresponds to the T3242 timer 706a, the T3243 timer flag 738b corresponds to the T3243 timer 706b, the T3242 timer value 736a corresponds to the T3242 timer 706a and the T3243 timer value 736b corresponds to the T3243 timer 706b. The T3242 timer 706a may be one example of a timer for an eCall (e.g., regular eCall) and the T3243 timer 706b may be one example of a timer for a test or reconfiguration eCall.

As described above, the eCall-only IVS 702 may trigger an eCall. When a regular eCall is initiated, the timer control module 704 starts the T3242 timer 706a. Accordingly, the timer control module 704 may set the T3242 timer flag 738a to indicate that the T3242 timer 706a is running and/or may store a T3242 timer value 736a (periodically or continuously, for example) in the memory 734.

When a test or reconfiguration eCall is initiated, the timer control module 704 starts the T3243 timer 706b. Accordingly, the timer control module 704 may set the T3243 timer flag 738b to indicate that the T3243 timer 706b is running and/or may store a T3243 timer value 736b (periodically or continuously, for example) in the memory 734.

After a power disruption, upon beginning a power reset, the timer control module 704 may determine whether either the T3242 timer 706a or the T3243 timer 706b was running before the power reset.

If the timer control module 704 determines that the T3242 timer 706a or the T3243 timer 706b was running before the power reset, the timer control module 704 may restart and/or resume the corresponding timer 706a-b in accordance with the above description. For example, if the T3242 timer value 736a and/or the T3242 timer flag 738a indicate that the T3242 timer was running before the power reset, the timer control module 704 may restart or resume the T3242 timer. The eCall-only IVS 702 may also register the eCall-only IVS on the network. For example, the communication control module 708 may send a registration signal to the network. The eCall-only IVS 702 may additionally initiate a location area update procedure as described above.

While at least one of the T3242 timer 706a and the T3243 timer 706b is running, the eCall-only IVS 702 may enter an idle state (e.g., MM IDLE) for the duration of the timer(s) (unless an eCall is currently being conducted, in which case the eCall-only IVS 702 may operate in an active state). For example, the eCall-only IVS 702 may remain registered on the network. The communication control module 708 may send signaling to the network via the transceiver 740 in order to remain registered on the network.

When the T3242 timer 706a and/or the T3243 timer 706b is expired, the eCall-only IVS 702 may detach from the network. For example, the communication control module 708 may send a detach message to the network by providing a detach message to the transceiver 740, which may transmit the detach message via the antenna(s) 742a-n.

Figure 8:
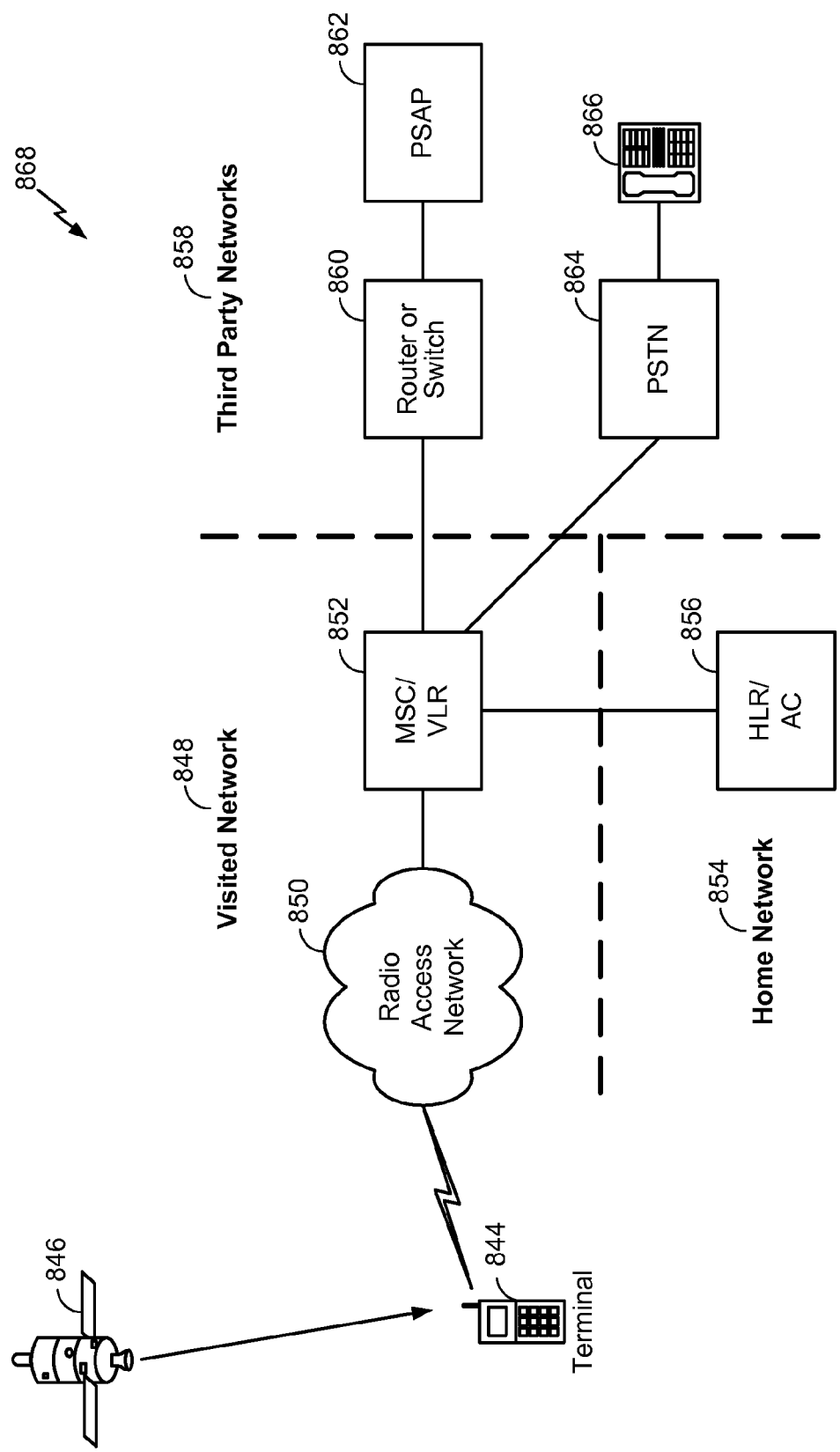
FIG. 8 shows one example of a network deployment, which may include a visited network, a home network and third party networks.

FIG. 8 shows one example of a network deployment 868, which may include a visited network 848, a home network 854 and third party networks 858. One or more elements of the visited network 848, home network 854 and/or third party networks 858 may be examples of elements included with the network 110 described in connection with FIG. 1. The visited network 848 may also be referred to as a Visited Public Land Mobile Network (V-PLMN), a serving network, etc. The home network 854 may also be referred to as a Home PLMN (H-PLMN). The visited network 848 may be a serving network for a terminal 844, which may be roaming from its home network 854. The visited network 848 and the home network 854 may be the same network if the terminal 844 is not roaming. The terminal 844 may be one example of the IVS 102 described in connection with FIG. 1.

The visited network 848 may include a radio access network (RAN) 850, a Mobile Switching Center (MSC)/Visitor Location Register (VLR) 852 and other network entities not shown in FIG. 8 for simplicity. The RAN 850 may be a Global System for Mobile Communications (GSM) network, a Wideband Code Division Multiple Access (WCDMA) network, a General Packet Radio Service (GPRS) access network, a Long Term Evolution (LTE) network, CDMA 1× network, a High Rate Packet Data (HRPD) network, an Ultra Mobile Broadband (UMB) network, etc. GSM, WCDMA, GPRS and LTE are part of Universal Mobile Telecommunication System (UMTS) and are described in documents from an organization named "3rd Generation Partnership Project" (3GPP). CDMA 1× and HRPD are part of cdma2000, and cdma2000 and UMB are described in documents from an organization named "3rd Generation Partnership Project 2" (3GPP2). The MSC (included in the MSC/VLR 852, for example) may perform switching functions for circuit-switched calls and may also route Short Message Service (SMS) messages. The VLR (included in the MSC/VLR 852, for example) may store registration information for terminals that have registered with the visited network 848.

The home network 854 may include a Home Location Register (HLR)/Authentication Center (AC) 856 and other network entities not shown in FIG. 8 for simplicity. The HLR may store subscription information for terminals that have service subscription with home network 854. The AC may perform authentication for terminals having service subscription with home network 854.

The third party networks 858 may include a router or switch 860 (e.g., a PSAP selected router), a PSAP 862, a Public Switched Telephone Network (PSTN) 864, and possibly other network entities not shown in FIG. 8. The router or switch 860 may route calls between MSC and PSAP 862. The PSAP 862 may be responsible for answering emergency calls and may also be referred to as an Emergency Center (EC). The PSAP 862 may be one example of the PSAP 112 described in connection with FIG. 1. The PSAP 862 may be operated or owned by a government agency (e.g., a county or city). The PSTN 864 may provide telephone services for conventional wireline telephones, such as a telephone 866.

FIG. 8 shows only some of the network entities that may be present in the visited network 848 and the home network 854. For example, the visited network 848 may include network entities supporting packet-switched calls and other services as well a location server to assist in obtaining terminal location.

The terminal 844 may be stationary or mobile and may also be referred to as a mobile station (MS) in GSM and CDMA 1×, a user equipment (UE) in WCDMA and LTE, an access terminal (AT) in HRPD, a SUPL enabled terminal (SET) in Secure User Plane Location (SUPL), a subscriber unit, a station, etc. The terminal 844 may be a device such as a cellular phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The terminal 844 may also be devices which communicate with a personal navigation device (PND), such as by short-range wireless, infrared, wireline connection, or other connection—regardless of whether satellite signal reception, assistance data reception, and/or position-related processing occurs at the device or at the PND. Also, the terminal 844 is intended to include all devices, including wireless communication devices, computers, laptops, etc., which are capable of communication with a server (via the Internet, Wi-Fi or other network, for example) regardless of whether satellite signal reception, assistance data reception, and/or position-related processing occurs at the device, at a server, or at another device associated with the network. Any operable combination of the above are also included. The terminal 844 may also be a dedicated In-Vehicle System (IVS), which may be permanently attached to (and possibly part of) a vehicle.

The terminal 844 may have a service subscription with the home network 854 and may be roaming in the visited network 848, as shown in FIG. 8. The terminal 844 may receive signals from the RAN 850 in the visited network 848 or may communicate with the RAN to obtain communication services. The terminal 844 may also communicate with the home network 854 for communication services when not roaming (not shown in FIG. 8). The terminal 844 may also receive signals from one or more satellites 846, which may be part of a satellite positioning system (SPS). An SPS typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). The terminal 844 may measure signals from the satellites 846 and obtain pseudo-range measurements for the satellites. The terminal 844 may also measure signals from base stations in the RAN 850 and obtain timing and/or signal strength measurements for the base stations. The pseudo-range measurements, timing measurements and/or signal strength measurements may be used to derive a position estimate for the terminal 844. A position estimate may also be referred to as a location estimate, a position fix, etc.

The terminal 844 may have an International Mobile Equipment Identity (IMEI), which is a unique number assigned to the terminal. The terminal 844 may be used for a service subscription of a user. The service subscription may be associated with an International Mobile Subscriber Identity (IMSI), which is a unique number assigned to a subscription for GSM and UMTS networks. The service subscription may also be associated with a Mobile Subscriber Integrated Services Digital Network Number (MSISDN), which is a telephone number for the service subscription. The IMSI may be used as a key for the service subscription in a subscriber database in the HLR (included in the HLR/AC 856, for example). The MSISDN may be dialed by other users to connect calls to terminal 844 used for the service subscription. The IMSI, the MSISDN, and other subscription information may be stored in a Subscriber Identity Module (SIM) or a Universal Subscriber Identity Module (USIM), which may be inserted into the terminal 844. The terminal 844 may also have no SIM/USIM, in which case the terminal 844 may have only an IMEI but no IMSI or MSISDN.

Wireless networks may be required to support different types of emergency calls. One type of emergency call may include eCalls, which are emergency calls that may have the characteristics described above. Support for eCalls may be required by the European Union and by other world regions and/or countries. An eCall may be a more specific type of emergency call, where additional emergency related data may be sent to establish the eCall and used to process the eCall. For example, the additional data may indicate how the eCall was initiated, a registration request, a follow-on request, information pertaining to the IVS (e.g., eCall-only mode or mixed-mode), a vehicle type and vehicle identification number (VIN), a timestamp, a position estimate and position confidence flag, the direction of travel, the number of passengers (e.g., with fastened seatbelts), a service provider for the terminal (if any), a trigger type (e.g., deployed airbags, bumper sensors, etc.) and/or possibly other information. The additional data may enable an eCall to be setup using a connection previously established for registration of the IVS or terminal making the eCall. In some configurations, the eCall may provide a geographic location of the terminal 844 to the PSAP 862.

Figure 9:
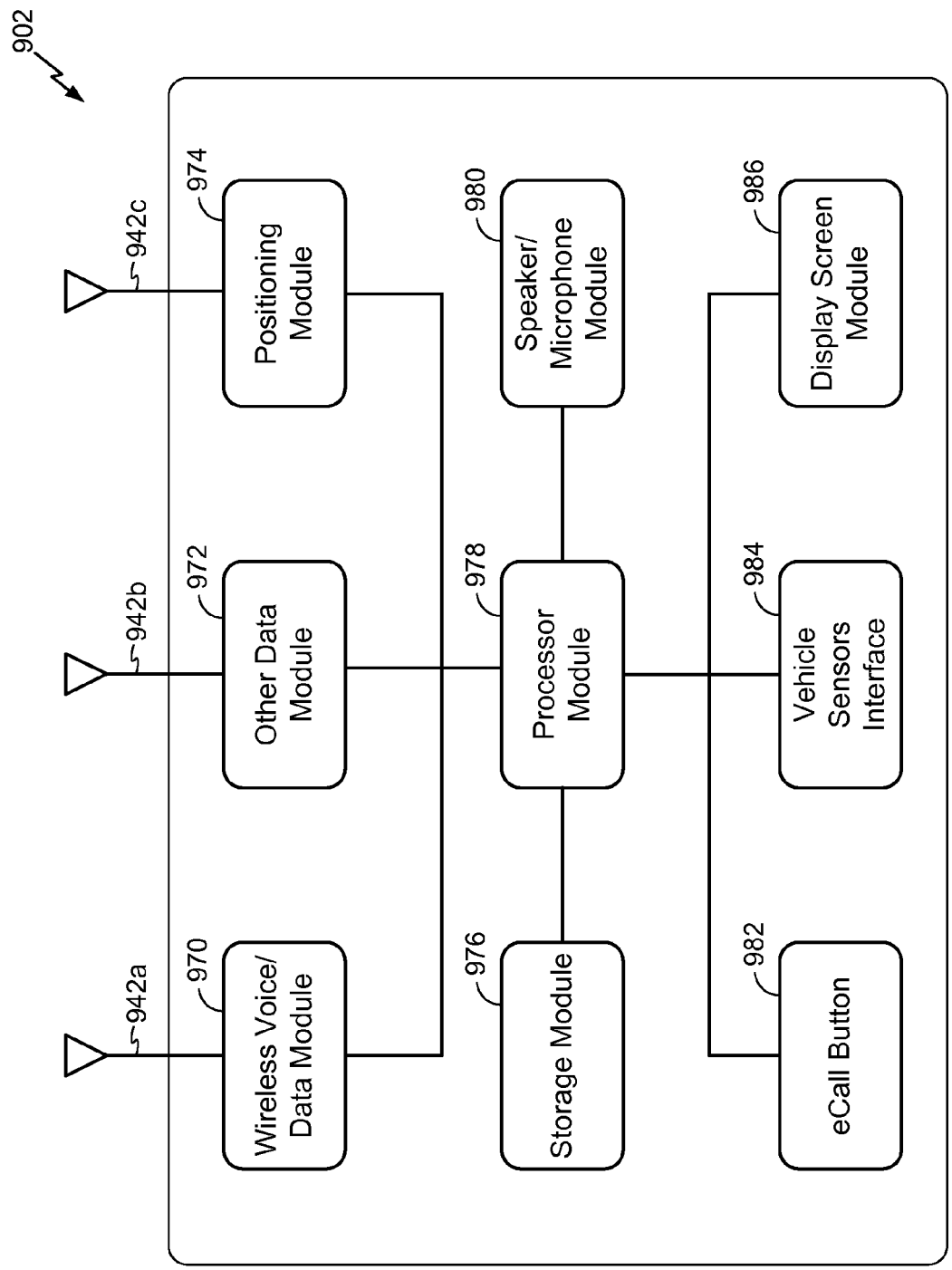
FIG. 9 is a block diagram illustrating another more specific example of an IVS that may be provisioned to operate as an eCall-only IVS.

FIG. 9 is a block diagram illustrating another more specific example of an IVS 902 that may be provisioned to operate as an eCall-only IVS. The IVS 902 may be one example of one or more of the in-vehicle systems 102, 302, 402, 702 and terminal 844 described in connection with one or more of FIGS. 1-8. The IVS 902 may include a processor module 978 coupled to a plurality of wireless modules that enable the IVS 902 to communicate wirelessly. For example, the wireless modules may include a wireless voice/data module 970, another data module 972 (e.g., a Bluetooth module) and a positioning module 974 (e.g., a GPS module), although the IVS 902 is not limited to the illustrated wireless modules. Each of the illustrated wireless modules is coupled to a respective antenna 942a-c. Although the antennas 942a-c are shown as separate antennas, a single unitary antenna or additional antennas may also be used and coupled to the wireless voice/data module 970, to the other data module 972 and/or to the positioning module 974.

The processor module 978 may also be coupled to a speaker/microphone module 980, an eCall button 982, a vehicle sensors interface 984 and/or a display screen module 986. Furthermore, the processor module 978 may be coupled to a storage module 976 that may include information that provisions the IVS 902 as an eCall-only capable device. The eCall button 982 may be used to manually initiate an emergency call in the event of an accident or other situation requiring attention or assistance from emergency services. The vehicle sensors interface 984 may be coupled to sensors (not illustrated) deployed in a vehicle and designed to detect an accident (e.g., collision) condition that may require attention or assistance from emergency services. Such vehicle sensors may be attached to an airbag deployment mechanism, vehicle body integrity sensors or the like.

The IVS 902 may be configured to transmit and receive voice and data communications to and from a network. For example, the IVS 902 may transmit signals to and receive signals from an MSC via a RAN 850 during emergency calls (following a registration attempt, for example). More specifically, the MSC enables emergency information from the IVS 902 to be communicated to the PSAP 862 via the router or switch 860 or the PSTN 864. Such emergency information may be communicated to the PSAP 862 once the IVS 902 initiates an emergency call using the appropriate emergency number (e.g., 112, 911, 000, etc.) stored in the device. The emergency information or data may include voice communications directly from a user and via the speaker/microphone module 980, data generated from sensors coupled to the vehicle sensors interface 984 and/or positioning information from the positioning module 974.

As mentioned earlier, the IVS 902 may be provisioned as an eCall-only device in some configurations. Such provisioning information may be stored in the storage module 976. The storage module 976 may be a nonvolatile storage, volatile storage, a Subscriber Identity Module (SIM), a Universal Subscriber Identity Module (USIM) and/or any other suitable storage capable element. For example, the storage module 976 may be included in or separate from the memory described above, depending on the configuration.

The speaker/microphone module 980 may be used during voice calls between the IVS 902 and the PSAP (e.g., PSAP 112, 862). Telematics application specific buttons, such as the eCall button 982, may be used to activate the eCall-only IVS or otherwise initiate the generation and transmittal of specific emergency data messages and/or emergency voice communications to the PSAP (e.g., PSAP 112, 862) via the eCall system. Furthermore, initiation of data communication may also be accomplished automatically via vehicle sensors, such as sensors coupled to the airbag deployment mechanism.

Each of the wireless voice data module 970, the other data module 972 and/or the positioning module 974 may include a transmitter to encode voice and data messages, which may be transmitted using antennas 942a-c via an over-the-air protocol such as CDMA, WCDMA, GSM, TDMA or the like. The wireless voice data module 970, the other data module 972 and/or the positioning module 974 may also be configured to transmit by other wireless communications, such as satellite communications. Each of the wireless voice data module 970, the other data module 972 and/or the positioning module 974 may also include a receiver to receive and decode voice and data messages (from a base station, an MSC, a PSAP 862 or any other component associated with the communications network). Such received voice and data messages may be received via an over-the-air protocol such as CDMA, WCDMA, GSM, TDMA, or the like. The wireless voice data module 970, the other data module 972 and/or the positioning module 974 may also be configured to receive other wireless communications, such as satellite communications. The transmitters and receivers may be integrated transceiver devices.

Figure 10:
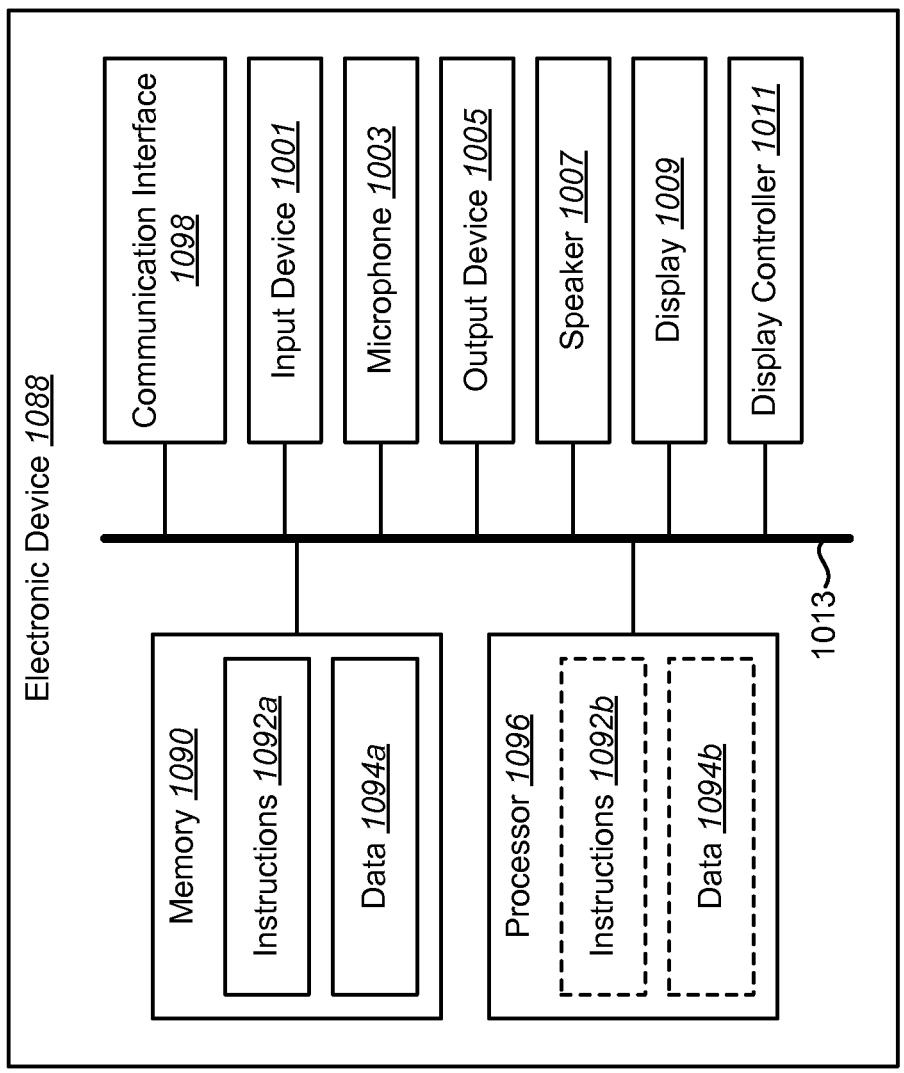
FIG. 10 illustrates various components that may be utilized in an electronic device.

FIG. 10 illustrates various components that may be utilized in an electronic device 1088. The illustrated components may be located within the same physical structure or in separate housings or structures. The electronic device 1088 described in connection with FIG. 10 may be implemented in accordance with one or more of the IVSs 102, 302, 402, 702, 902 and/or the terminal 844 described herein. The electronic device 1088 includes a processor 1096. The processor 1096 may be a general purpose single- or multi-chip microprocessor (e.g., an ARM), a special purpose microprocessor (e.g., a digital signal processor (DSP)), a microcontroller, a programmable gate array, etc. The processor 1096 may be referred to as a central processing unit (CPU). Although just a single processor 1096 is shown in the electronic device 1088 of FIG. 10, in an alternative configuration, a combination of processors (e.g., an ARM and DSP) could be used.

The electronic device 1088 also includes memory 1090 in electronic communication with the processor 1096. That is, the processor 1096 can read information from and/or write information to the memory 1090. The memory 1090 may be any electronic component capable of storing electronic information. The memory 1090 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1094a and instructions 1092a may be stored in the memory 1090. The instructions 1092a may include one or more programs, routines, sub-routines, functions, procedures, etc. The instructions 1092a may include a single computer-readable statement or many computer-readable statements. The instructions 1092a may be executable by the processor 1096 to implement one or more of the methods, functions and procedures described above. Executing the instructions 1092a may involve the use of the data 1094a that is stored in the memory 1090. FIG. 10 shows some instructions 1092b and data 1094b being loaded into the processor 1096 (which may come from instructions 1092a and data 1094a).

The electronic device 1088 may also include one or more communication interfaces 1098 for communicating with other electronic devices. The communication interfaces 1098 may be based on wired communication technology, wireless communication technology, or both. Examples of different types of communication interfaces 1098 include a serial port, a parallel port, a Universal Serial Bus (USB), an Ethernet adapter, an Institute of Electrical and Electronics Engineers (IEEE) 1394 bus interface, a small computer system interface (SCSI) bus interface, an infrared (IR) communication port, a Bluetooth wireless communication adapter, a 3rd Generation Partnership Project (3GPP) transceiver, an IEEE 802.11 ("Wi-Fi") transceiver and so forth. For example, the communication interface 1098 may be coupled to one or more antennas (not shown) for transmitting and receiving wireless signals.

The electronic device 1088 may also include one or more input devices 1001 and one or more output devices 1005. Examples of different kinds of input devices 1001 include a keyboard, mouse, microphone, remote control device, button, joystick, trackball, touchpad, lightpen, etc. For instance, the electronic device 1088 may include one or more microphones 1003 for capturing acoustic signals. In one configuration, a microphone 1003 may be a transducer that converts acoustic signals (e.g., voice, speech) into electrical or electronic signals. Examples of different kinds of output devices 1005 include a speaker, printer, etc. For instance, the electronic device 1088 may include one or more speakers 1007. In one configuration, a speaker 1007 may be a transducer that converts electrical or electronic signals into acoustic signals. One specific type of output device which may or may not be included in an electronic device 1088 is a display device 1009. Display devices 1009 used with configurations disclosed herein may utilize any suitable image projection technology, such as a cathode ray tube (CRT), liquid crystal display (LCD), light-emitting diode (LED), gas plasma, electroluminescence, or the like. Optionally, a display controller 1011 may also be provided, for converting data stored in the memory 1090 into text, graphics, and/or moving images (as appropriate) shown on the display device 1009.

The various components of the electronic device 1088 may be coupled together by one or more buses, which may include a power bus, a control signal bus, a status signal bus, a data bus, etc. For simplicity, the various buses are illustrated in FIG. 10 as a bus system 1013. It should be noted that FIG. 10 illustrates only one possible configuration of an electronic device 1088. Various other architectures and components may be utilized.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The functions described herein may be stored as one or more instructions on a processor-readable or computer-readable medium. The term "computer-readable medium" refers to any available medium that can be accessed by a computer or processor. By way of example, and not limitation, such a medium may comprise Random-Access Memory (RAM), Read-Only Memory (ROM), Electrically Erasable Programmable Read-Only Memory (EEPROM), flash memory, Compact Disc Read-Only Memory (CD-ROM) or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc, where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for timer continuation in a power reset scenario by an in-vehicle system, comprising:
   beginning a power reset;
   determining whether a timer associated with an emergency call was running before the power reset, wherein the emergency call is an eCall or a test-or-reconfiguration eCall, and wherein the timer is a T3242 timer or a T3243 timer;
   continuing timer use if the timer was running before the power reset; and
   registering the in-vehicle system on a network if the timer was running before the power reset.

2. The method of claim 1, further comprising initiating a location area update procedure if the timer was running before the power reset.

3. The method of claim 1, further comprising entering an idle state if the timer was running before the power reset.

4. The method of claim 1, wherein continuing timer use comprises resuming the timer based on a previously stored timer value.

5. The method of claim 1, wherein continuing timer use comprises restarting the timer.

6. An in-vehicle system, comprising:
   timer control circuitry that determines whether a timer associated with an emergency call was running before a power reset, wherein the emergency call is an eCall or a test-or-reconfiguration eCall, and wherein the timer is a T3242 timer or a T3243 timer;
   wherein the timer control circuitry continues timer use if the timer was running before the power reset; and
   communication control circuitry coupled to the timer control circuitry, wherein the communication control circuitry registers the in-vehicle system on a network if the timer was running before the power reset.

7. The in-vehicle system of claim 6, wherein the communication control circuitry initiates a location area update procedure if the timer was running before the power reset.

8. The in-vehicle system of claim 6, wherein the communication control circuitry causes the in-vehicle system to enter an idle state if the timer was running before the power reset.

9. The in-vehicle system of claim 6, wherein continuing timer use comprises resuming the timer based on a previously stored timer value.

10. The in-vehicle system of claim 6, wherein continuing timer use comprises restarting the timer.

11. A non-transitory tangible computer-readable medium having instructions thereon, the instructions comprising:

code for causing an in-vehicle system to begin a power reset;

code for causing the in-vehicle system to determine whether a timer associated with an emergency call was running before the power reset, wherein the emergency call is an eCall or a test-or-reconfiguration eCall, and wherein the timer is a T3242 timer or a T3243 timer;

code for causing the in-vehicle system to continue timer use if the timer was running before the power reset; and code for causing the in-vehicle system to register the in-vehicle system on a network if the timer was running before the power reset.

12. The non-transitory tangible computer-readable medium of claim 11, the instructions further comprising code for causing the in-vehicle system to initiate a location area update procedure if the timer was running before the power reset.

13. The non-transitory tangible computer-readable medium of claim 11, the instructions further comprising code for causing the in-vehicle system to enter an idle state if the timer was running before the power reset.

14. The non-transitory tangible computer-readable medium of claim 11, wherein continuing timer use comprises resuming the timer based on a previously stored timer value.

15. The non-transitory tangible computer-readable medium of claim 11, wherein continuing timer use comprises restarting the timer.

16. An apparatus for timer continuation in a power reset scenario, comprising:

means for beginning a power reset;

means for determining whether a timer associated with an emergency call was running before the power reset, wherein the emergency call is an eCall or a test-or-reconfiguration eCall, and wherein the timer is a T3242 timer or a T3243 timer;

means for continuing timer use if the timer was running before the power reset; and means for registering the apparatus on a network if the timer was running before the power reset.

17. The apparatus of claim 16, further comprising means for initiating a location area update procedure if the timer was running before the power reset.

18. The apparatus of claim 16, further comprising means for entering an idle state if the timer was running before the power reset.

19. The apparatus of claim 16, wherein continuing timer use comprises resuming the timer based on a previously stored timer value.

20. The apparatus of claim 16, wherein continuing timer use comprises restarting the timer.

\* \* \* \* \*